United States Patent
Agrawal et al.

(10) Patent No.: US 11,722,453 B2
(45) Date of Patent: *Aug. 8, 2023

(54) NAME COMPOSITION ASSISTANCE IN MESSAGING APPLICATIONS

(71) Applicant: GOOGLE TECHNOLOGY HOLDINGS LLC, Mountain View, CA (US)

(72) Inventors: Amit Kumar Agrawal, Bangalore (IN); Mayank Gupta, Bangalore (IN); Rachit Mittal, Bangalore (IN)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,143

(22) Filed: Feb. 8, 2022

(65) Prior Publication Data

US 2022/0166742 A1     May 26, 2022

Related U.S. Application Data

(63) Continuation of application No. 17/078,159, filed on Oct. 23, 2020, now Pat. No. 11,283,752, which is a
(Continued)

(51) Int. Cl.
*H04L 51/48*     (2022.01)
*H04L 51/02*     (2022.01)
*H04L 61/4594*     (2022.01)

(52) U.S. Cl.
CPC .............. *H04L 51/48* (2022.05); *H04L 51/02* (2013.01); *H04L 61/4594* (2022.05)

(58) Field of Classification Search
CPC .............. G06F 16/24575; G06F 40/295; G06F 16/245; G06F 16/285; G06F 40/205;
(Continued)

(56) References Cited

U.S. PATENT DOCUMENTS

| | | | |
|---|---|---|---|
| 7,979,802 B1* | 7/2011 | Appelman | G06F 3/0482 715/752 |
| 2002/0143828 A1* | 10/2002 | Montero | G06F 40/295 715/260 |

(Continued)

OTHER PUBLICATIONS

Mediawi Ki. Org, "Extension: WikiUserInfo", http:l/www.mediawiki.org/w/index.php?title= Extension: WikiUserInfo&oldid=77831708, Sep. 8, 2013, 6 pages.
(Continued)

*Primary Examiner* — Phuong H Nguyen
(74) *Attorney, Agent, or Firm* — Botos Churchill IP Law (57) ABSTRACT

A method includes identifying, at an electronic device a candidate name responsive to user input indicating a salutational trigger during composition of a body of a message of a messaging application. Identifying the candidate name including at least one of: parsing a recipient-specific portion of a recipient message address of the message; parsing a display name associated with the recipient message address; parsing a content of the message body; parsing an attachment name associated with an attachment field of the message; identifying the candidate name from a contact record selected from a contacts database based on a recipient-specific portion of a recipient message address of the message; and parsing user-readable content of an application from which composition of the message was triggered. The method further includes facilitating composition of a recipient name in the body of the message based on the candidate name.

23 Claims, 7 Drawing Sheets

Related U.S. Application Data continuation of application No. 16/559,808, filed on Sep. 4, 2019, now Pat. No. 10,848,453, which is a continuation of application No. 14/089,830, filed on Nov. 26, 2013, now Pat. No. 10,447,641.

(60) Provisional application No. 61/904,731, filed on Nov. 15, 2013.

(58) Field of Classification Search
CPC ........... G06F 16/2477; G06F 16/90344; G06F 40/274; G06F 16/3322; G06F 16/90324
See application file for complete search history.

(56) References Cited

U.S. PATENT DOCUMENTS

| | | |
|---|---|---|
| 2006/0288298 A1 | 12/2006 | Haitani et al. |
| 2010/0070486 A1 | 3/2010 | Punaganti et al. |
| 2012/0150979 A1* | 6/2012 | Monaco ............... G06Q 10/107 709/206 |
| 2012/0260188 A1* | 10/2012 | Park .................... G06Q 10/107 707/E17.014 |
| 2013/0318175 A1 | 11/2013 | Vasudevan et al. |
| 2014/0025371 A1* | 1/2014 | Min ...................... G06Q 10/10 704/9 |

OTHER PUBLICATIONS

Microsoft Corporation, "MailAddress Constructor (String)", http:f/msdn.microsoft.com/en-us/library/591bk9e8 (v=vs.110).aspx, 2013, 4 pages.

Vitor R. Carvalho and William W. Cohen, "Learning to Extract Signature and Reply Lines from Email", http://www.cs.cmu.edu/-wcohen/postscript/email-2004.pdf, 1st Conf. on Email and Anti-Spam (CEAS), Jul. 30-31, 2004, 8 pages.

* cited by examiner

NAME COMPOSITION ASSISTANCE IN MESSAGING APPLICATIONS

CROSS-REFERENCE TO RELATED APPLICATIONS

The present application is a continuation of U.S. patent application Ser. No. 17/078,159 filed Oct. 23, 2020, which is a continuation of U.S. patent application Ser. No. 16/559,808 filed Sep. 4, 2019 and issued as U.S. Pat. No. 10,848,453, which is a continuation of U.S. patent application Ser. No. 14/089,830 filed Nov. 26, 2013 and issued as U.S. Pat. No. 10,447,641, which claims the benefit of the filing date of U.S. Provisional Patent Application No. 61/904,731 filed Nov. 15, 2013, the entire disclosures of which are hereby incorporated herein by reference.

FIELD OF THE DISCLOSURE

The present disclosure relates generally to electronic messaging applications and more particularly to composition of messages in electronic messaging applications.

BACKGROUND

Following the precedent of the pen-and-paper analogues that preceded them, emails, instant messages (IMs), text messages, and other electronic messages often are composed with a salutation or greeting that includes the name of one or more of the intended recipients of the electronic message. However, this gives rise to situations whereby the message composer inadvertently misspells a recipient's name in the greeting or elsewhere in the message body. Such errors are particularly common when the recipient's name is uncommon in the culture of the sender or where the name is spelled similarly to a common non-name word. Conventional error detection mechanisms, such as spell-check processes that use a predefined general dictionary, often fail to catch such situations. To illustrate, the recipient's name may be similar in spelling to a common word and the sender may unconsciously spell the recipient's name as the common word, which then would cause the misspelling to go undetected as it matches a spelling found in the spell-check dictionary. Additionally, even when the recipient's name is spelled correctly by the sender, the auto-correct feature in some messaging applications change the name to match a word found in the spell-check dictionary. Such incidents can cause embarrassment or confusion for the sender and the recipient.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

DETAILED DESCRIPTION

The following description is intended to convey a thorough understanding of the present disclosure by providing a number of specific embodiments and details involving name composition assistance during composition of an electronic message at an electronic device. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-11 illustrate example techniques for providing automated name composition assistance in a message body of an electronic message being composed at an electronic device. In at least one embodiment, the electronic device identifies one or more candidate recipient names based on message context and, in response to identifying the user is composing a salutation or other greeting anticipated to include a recipient's name in a body of the message, provides name composition assistance using the one or more identified candidate names to facilitate accurate composition of the recipient's name. The name composition assistance can be provided as the presentation of a graphical representation of a selected candidate name in accordance with one or more presentation options, such as an automated suggest ("autosuggest") option, an automated complete ("autocomplete") option, and an automated correct ("autocorrect") option. For the autosuggest option, upon identifying user input indicating a salutational trigger (e.g., typing a salutational term, such as "Hello" or "Dear", or initiating entry of the first word of the message body), one or more candidate names are graphically presented as a user-selectable option via a graphical user interface (GUI) of the electronic device, and the user's selection of the user-selectable option results in the automated filling ("autofill") of the selected candidate name in the message body as part of the salutation. For the autocomplete option, upon identifying a salutational trigger and receiving user input indicating composition of initial letters of a non-salutational term in the message body, a candidate name is selected (if there are more than one candidate names) and the electronic device provides the graphical representation of the candidate name by autonomously completing the word in the message body based on the selected candidate name. The user may then elect to accept this completed word as the intended recipient name, or reject the completed word and thus cause its removal from the message body. For the autocorrect option, the electronic device determines whether a salutation in the message body includes a word matching a candidate name, and if there is a mismatch, displays a notification that the user may have erred in composing a recipient name in the message body. This notification may include a user-selectable option to replace a word in the salutation with a suggested candidate name. The autocorrect option may be employed following completion of the salutation and before composition of the remainder of the message body, after the message body has been composed (e.g., when the user has instructed the messaging application to initiate transmission of the composed electronic message), and the like. Entry of salutations and other words may be via typing on a keyboard, typing on a virtual (touch screen) keyboard, swiping across a virtual keyboard, mouse or touchpad selection of letters, chorded keyboard or keyset typing, speech recognition, or other type of text entry.

The identification of candidate names for the name composition assistance process may be determined from internal message context, external message context, or a combination thereof. The internal message context includes fields of the electronic message itself, such as recipient message addresses in the recipient message address fields of the message, display names of display name fields associated with the recipient message addresses, attachment names of attachment files listed in attachment fields (and the content of the attached files), as well as content of the message body itself, such as the subject line of the message or the content of a previous electronic message that has been included in the message body of the electronic message being composed. The external message context includes message context other than the fields of the electronic message being composed, and thus can include, for example, a contacts database maintained at the electronic device, or the content of the application from which the composition of the electronic message was triggered (e.g., the content of a webpage that included a link that, when selected, initiates composition of an electronic message). In at least one embodiment, the electronic device identifies candidate names from internal or external message context by parsing the content of the message context to identify individual words or combinations or words that are predicted to represent name words, or by using such parsed words to perform a name lookup in, for example, a contacts database to identify a corresponding candidate name. This candidate name identification through internal and external message context thus may be used to supplement conventional spell-check processes that rely on predefined spelling dictionaries that do not reflect the particular recipient name context or other content of the electronic message being composed.

For ease of illustration, much of the following description of the automated name composition assistance techniques is provided in accordance with an example usage of an email messaging application of a portable electronic device. However, these automated name composition techniques are not limited to this context, but instead may be used for any of a variety of electronic messaging applications, such as instant messaging (IM) applications, text messaging applications, microblogging applications, social media applications, and the like.

Figure 1:
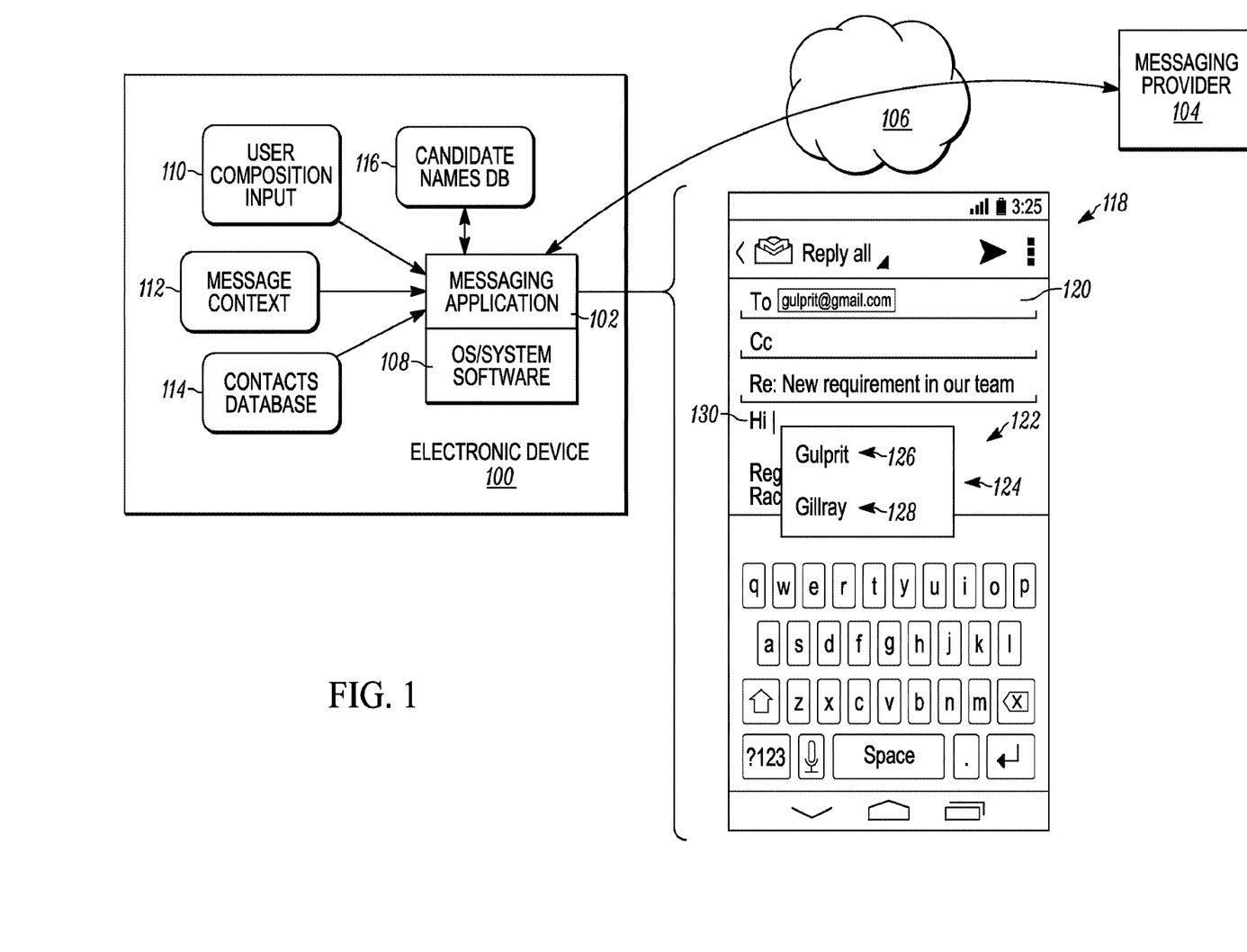
FIG. 1 is a diagram illustrating an electronic device employing recipient name composition assistance using an autosuggest option for a messaging application in accordance with at least one embodiment of the present disclosure.

FIG. 1 illustrates an electronic device 100 employing automated recipient name composition assistance during electronic message composition in accordance with at least one embodiment of the present disclosure. The electronic device 100 can include any of a variety of devices that may be utilized for electronic messaging, such as a computing-enabled cellular phone ("smartphone") or computing-enabled watch ("smartwatch"), tablet computer, notebook computer, desktop computer, gaming console, personal digital assistant (PDA), and the like.

In the depicted example, the electronic device 100 includes a messaging application 102 that operates to communicate electronic messages between the electronic device 100 and other electronic devices via an electronic messaging provider 104 accessible via one or more networks 106. To illustrate, the messaging application 102 can include a web-based email application (e.g., Google Gmail™) that interfaces with an Internet email server (one embodiment of the messaging provider 104) via the Internet (one embodiment of the network 106). As another example, the messaging application 102 can include a Microsoft Outlook™ email client that interfaces with a Microsoft Exchange™ server (one embodiment of the messaging provider 104) via an internal corporate network, the Internet, or a combination thereof. As yet another example, the messaging application 102 can include an instant messaging (IM) application that communicates with a web-based IM server (one embodiment of the messaging provider 104) via the Internet. Other examples of the messaging application 102 include, for example, a text messaging application (e.g., a simple messaging service (SMS) application or multimedia messaging service (MMS) application), a microblogging application (e.g., the "tweeting" application provided by Twitter Inc.), a social media application (e.g., Facebook™ or Google Circles™) and the like. In some implementations, the electronic messaging application 102 sends and receives electronic messages in coordination with an operating system (OS) 108 (or other system software) of the electronic device 100. To illustrate, the OS 108 may facilitate access to the wired or wireless network interface that couples to the network 106, access to a display and user input devices (e.g., touchscreen, microphone, mouse, or keyboard) of the electronic device 100, and the like.

One messaging function provided by the messaging application 102 is the presentation of a graphical user interface (GUI) to facilitate a user's composition of electronic messages that are to be transmitted to one or more recipients via the messaging provider 104. Electronic message composition is controlled via user composition input 110 received via one or more user input interfaces associated with this GUI, such as a touchscreen, microphone, mouse, or keyboard. The user composition input 110 typically includes an instruction to initiate the electronic message composition, such as the user's selection of a "compose" button displayed in a graphical user interface (GUI) provided by the messaging application 102 or via user voice commands instructing the electronic device 100 to initiate new electronic message. The user composition input 110 also includes user input to provide recipient message addresses in one or more message address fields, and user input to provide text and other typographical content into a message body of the electronic message being composed.

In the course of composing an electronic message, a user of the electronic device 100 may desire to address one or more recipients by name in the message body, such as by initiating the content of the message body with a salutation that includes one or more recipient names. However, there is a significant possibility that the user may misspell an intended recipient's name in the message body, either because the user is not familiar with the name (e.g., it may not be common in the user's culture), it may have multiple possible spellings (e.g., "Carl" vs. "Karl"), or it may have a spelling very similar to another word. To illustrate, a recipient of an electronic message may be named "Gulprit", which the user may inadvertently type as "Culprit" in the message body due to their spelling similarities. To reduce or avoid recipient name spelling mishaps, in at least one embodiment the messaging application 102 provides automated recipient name composition assistance by identifying candidate names based on message context and then autonomously facilitating the correct name usage in the message body through various user assistance options, such as an autosuggest option, an autocomplete option, an autocorrect option, and the like.

In one embodiment, this recipient name composition assistance is facilitated by various information maintained at the electronic device 100. Such information can include, for example, the message context 112 of the message itself. This message context 112 can include internal message context, which is the information in the fields of the message being composed, such as information in the recipient message address fields such as email addresses in the "to:", "cc:" and "bcc:" address fields, names or other name-based information already present, or subsequently added to, the message body, and the like. This message context 112 also can include external message context, which is information that is not directly obtained from the fields of the electronic message being composed, such as content in another application that triggered the composition of the electronic message or a contact record of a recipient that is indirectly accessed using some information from the internal message context.

The messaging application 102 may use this message context 112 to identify one or more candidate names (that is, names that have potential to be used by the user in composing the message body) either directly, such as by generating candidate names from a parsing of recipient-specific portions of email addresses in the recipient fields, or indirectly, such as by identifying recipient-specific identifiers from the message fields and then using these recipient-specific identifiers to look up the corresponding recipient's name from, for example, a contacts database 114 maintained at the electronic device 100. The contacts database 114 can include, for example, a permanent contacts listing of contact records that has been collected by the messaging application 102 or another application that has permitted access to its contacts database, such as the Google Contacts entries available in the Google Gmail™ application, the set of contact entries made available in the Microsoft Outlook™ application, or the set of "friend" entries made available in a user's Facebook™ account. The candidate names so identified may be stored in a temporary candidate name database 116, which may be a list, table, or other data structure implemented in, for example, memory space or disc space allocated to the messaging application 102, and may persist for the duration of the composition of the electronic message, for the duration that the messaging application 102 is running or otherwise active, and the like. Various techniques for identifying candidate names are described in detail below.

With one or more candidate names identified and stored to the candidate names database 116, the messaging application 102 monitors the user composition input 110 to detect any potential salutation triggers that may include, or be associated with, a recipient name. Such salutation triggers can include, for example, user input indicating the typing of a typical introductory salutation, such as the user typing the word "Hi" or "Dear" at the start of the message body. Moreover, a salutation trigger may be the initial user input for the content of the message body (that is, the typing of the first few letters or word in the message body), and in particular, a salutation trigger may occur when the first few letters typed in the message body substantially match the corresponding initial letters of an identified candidate name. In response to detecting the salutation trigger, the messaging application 102 attempts to assist the user's correct composition of a recipient name in the message body. As described above, this assistance may be provided as a graphical representation of the candidate name as part of one or more user assistance options, such as an autosuggest option, an autocomplete option, an autocorrect option, and the like.

To illustrate, FIG. 1 depicts a message composition GUI 118 of the messaging application 102 for the composition of an email message to a recipient named "Gulprit" at the email address "gulprit@gmail.com" as indicated by the to: address field 120 of the email message. This message composition GUI 118 illustrates an implementation of the autosuggest option, whereby the messaging application 102 identifies "Gulprit" as a candidate name from the email address "gulprit@gmail.com" and, in response to user input representing the input of the word "Hi" 130 into a message body 122 of the email message, the messaging application 102 provides an autosuggest option for completion of the salutation by presenting a user-selectable option 124 in the GUI 118 that offers a graphical representation of the name "Gulprit" as one candidate name entry 126 identified from the message context 112 and a graphical representation of the name "Gillray" as another candidate name entry 128 that is identified from, for example, a pre-defined spelling dictionary having "Gillray" as an entry. While the user-selectable option 124 is illustrated as a graphical depiction of a list of selectable candidate name entries 126, 128, the user-selectable option 124 for autosuggesting candidate names can be implemented in any of a variety of ways consistent with the teachings herein. With the user-selectable option 124 so displayed, assuming the user was intending to address Gulprit in the message body 122, the user can select the "Gulprit" candidate name entry 126 from the user-selectable option 124, in response to which the messaging application 102 fills in the name "Gulprit" into the current cursor location in the message body 122. In this manner, the recipient name "Gulprit" is correctly entered into the message body 122 and the potential for user error in self-entry of the name "Gulprit" is bypassed.

Figure 2:
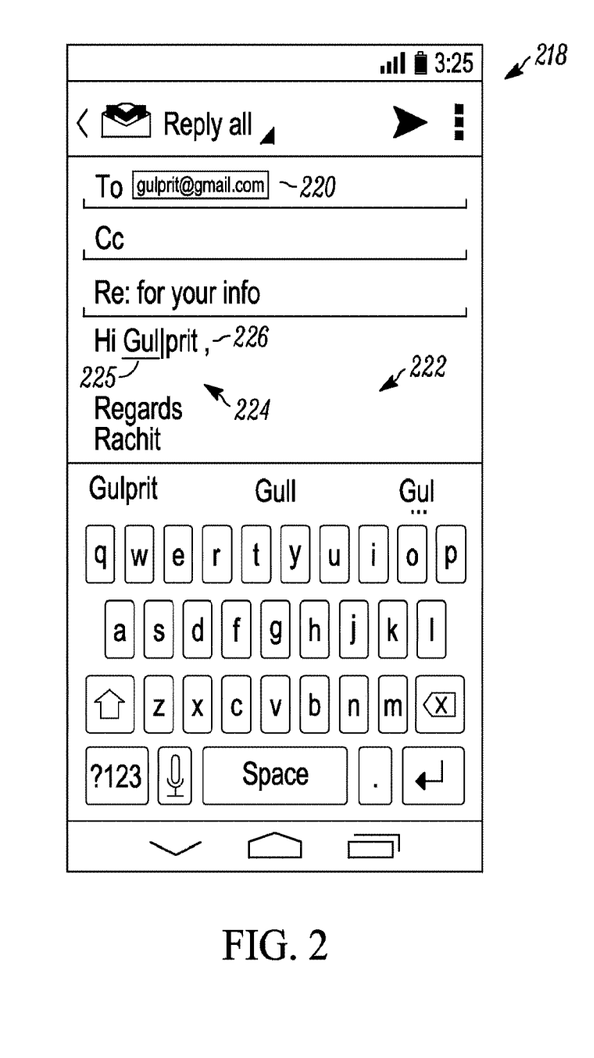
FIG. 2 is a diagram illustrating a message composition interface of a messaging application that employs recipient name composition assistance using an autocomplete option in accordance with at least one embodiment of the present disclosure.
Figure 3:
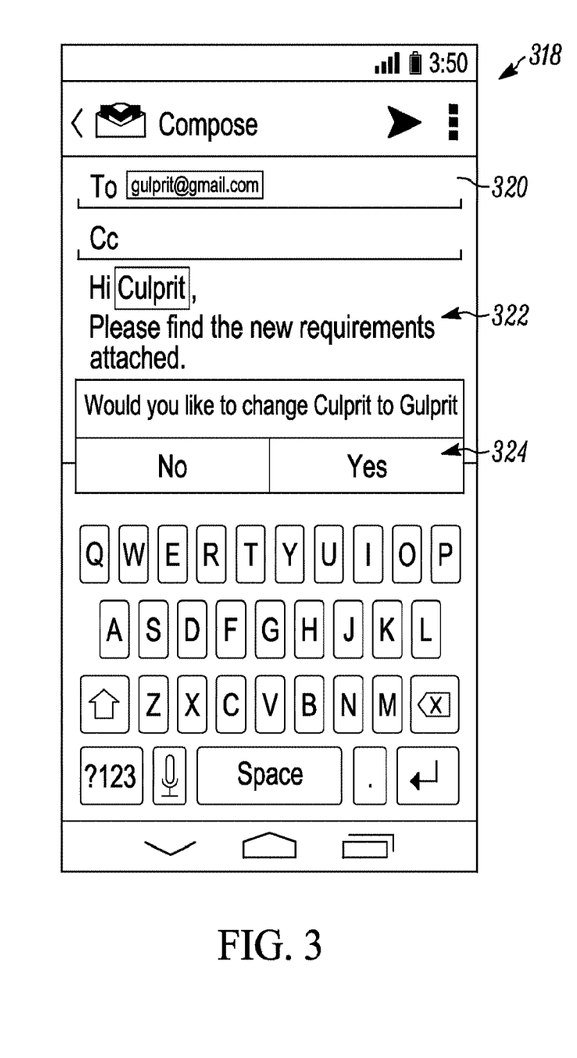
FIG. 3 is a diagram illustrating a message composition interface of a messaging application that employs recipient name composition assistance using an autocorrect option in accordance with at least one embodiment of the present disclosure.
Figure 4:
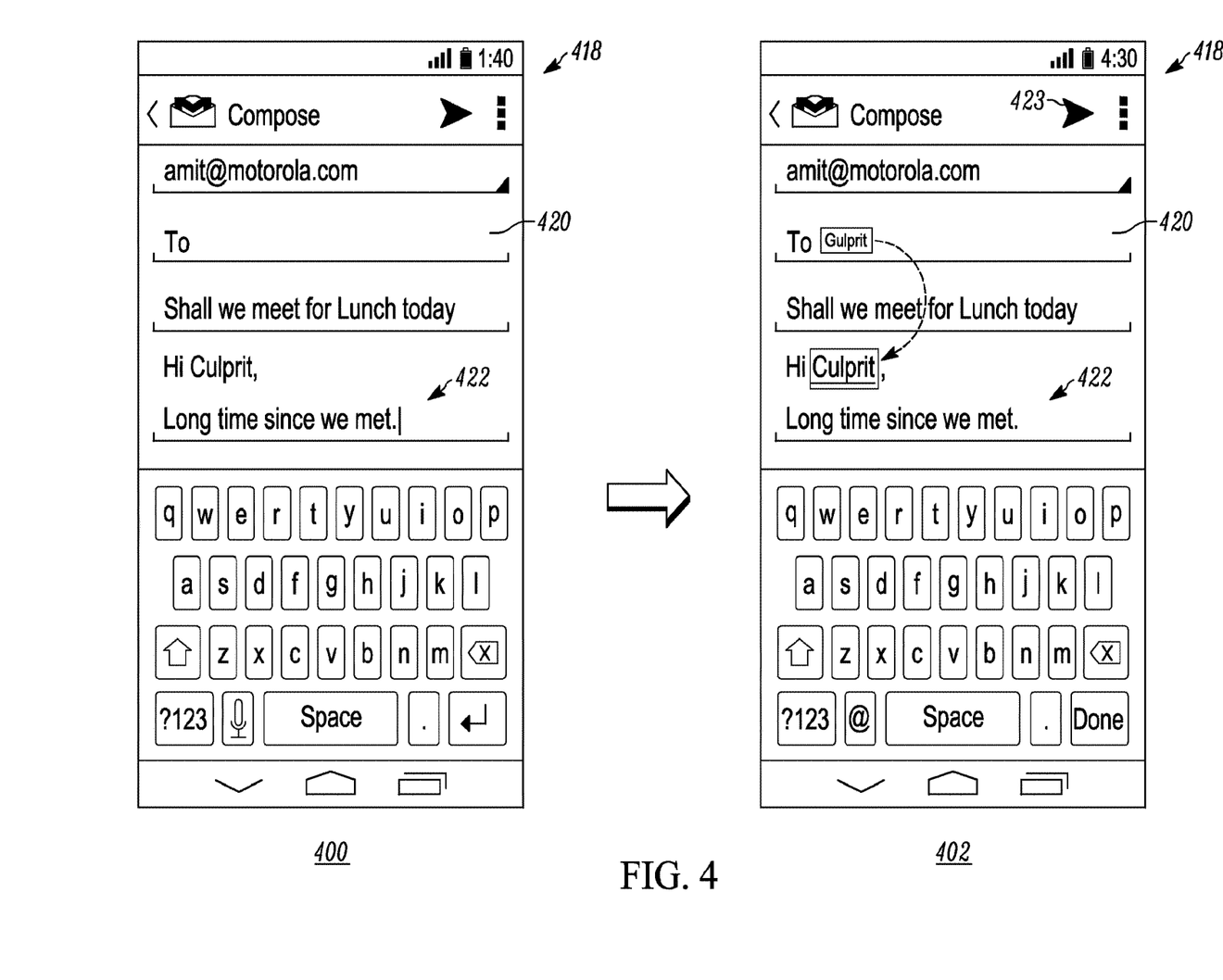
FIG. 4 is a diagram illustrating a message composition interface of a messaging application that employs recipient name composition assistance using a post-composition autocorrect option in accordance with at least one embodiment of the present disclosure.

FIGS. 2, 3, and 4 illustrate other automated recipient name composition assistance options that may be provided by the messaging application 102 of the electronic device 100 of FIG. 1 in association with electronic message composition. For example, FIG. 2 illustrates a message composition GUI 218 that is provided by the messaging application 102 and which provides an autocomplete option for name composition assistance. For the autocomplete option, the messaging application 102 monitors the user composition input 110 (FIG. 1) to detect user input representing the typing or other entry of an initial set of letters of a word in the message body 222 of the message composition GUI 218. In the event that the initial set of letters matches the corresponding initial set of letters of a candidate name identified from the message context 112 of the electronic message being composed, the messaging application 102 provides a graphical representation of the candidate name via an autocomplete option 224 that represents a suggested completion of the word in the message body 222.

In this example, the candidate name "Gulprit" is identified from the email address "gulprit@gmail.com" in the to: address field 220. For the autocomplete option 224, when the user types in a salutational trigger "Hi" followed by a space character and then three initial letters "Gul" of the word 225 following the salutational trigger, the messaging application 102 identifies this initial set of letters of the word 225 as a sufficient match with the candidate name "Gulprit" and thus autocompletes the word 225 as the candidate name "Gulprit". As illustrated, this autocompletion can include, for example, automatically introducing the remaining letters "prit" of the candidate name "Gulprit" into the messaging body 222 following the initial letters "Gul" and providing some indicator that these final letters 226 are autocompleted, such as by using a different color text, underlining, and the like. If the autocompleted name is the word the user was intending to type, the user can indicate assent to the autocompletion by, for example, selecting the "space" bar on a keyboard or selecting an "accept" button or other accept feature (not shown) associated with the autocomplete option 224 in the message composition GUI 218.

FIG. 3 illustrates a message composition GUI 318 that is provided by the messaging application 102 and which provides an autocorrect option. For this approach to recipient name composition assistance, the messaging application 102 provides an autocorrect option 324 to replace a word with an identified candidate name after the word has already been typed and completed in the message body 322. Thus, the messaging application 102 identifies a completed word in the message body 322 as potentially representing a recipient name and verifies whether the word matches a candidate name identified for the recipient name. If the word does not sufficiently match a candidate name, the messaging application 102 may display an autocorrect option 324 at the GUI 318 to provide the user with the option to replace the word with a candidate name graphically represented in the autocorrect option 324. In the depicted example, the autocorrect option 324 includes a dialog box that poses the option to the user to replace the word "Culprit" in the message body with the candidate name "Gulprit" identified from the email address in the to: address field 320. In this example, there word "Culprit" may be identified as a potentially incorrectly typed recipient name due to, for example, it immediately following the salutation trigger "Hi", it being capitalized without being the first word of a sentence, or because it substantially matches the name "Gulprit."

The messaging application 102 can analyze a message body of an electronic message being composed for opportunities to present an autocorrect option at one or more points in the message composition process. In the example of FIG. 3, a recipient messaging address (e.g., "gulprit@gmail.com") has already been entered into a recipient message address field of the electronic message being composed at the time that the message body composition commences, and thus the messaging application 102 can use this recipient messaging address to identify one or more candidate names for the autocorrect option. Thus, when completion of a potential name word in the message body is signaled (e.g., by the user typing a "space" character or other white space character after the word), the messaging application 102 can check the word at the time of completion. However, in some instances, the user may initiate composition of the message body before completing any of the recipient fields of the electronic message, and thus there may not be sufficient message context for the messaging application 102 to identify a candidate name at the time of message composition. Accordingly, in other instances, the analysis of the message body for one or more potential words for name autocorrect may be delayed until after recipient information is entered by the user.

FIG. 4 illustrates an example of the process of delaying an autocorrect option until message composition has been substantially completed. In this example, a screenshot 400 illustrates a state of a message composition GUI 418 after a user has typed a message in a message body 422 but prior to completing any of the recipient message address fields of the message composition GUI 418. The user-typed message includes a misspelled representation of the name "Gulprit" as "Culprit". However, because the recipient message address fields have not yet be completed at this point, the messaging application 102 may be unable to identify the error because no candidate names are able to be identified, and "Culprit" is a correctly-spelled word, and thus would not be detected using a standard spell-check process with a predefined spelling dictionary. In contrast, a screenshot 402 illustrates the message composition GUI 418 after the user has completed the to: address field 420 with the nickname "Gulprit" (which the messaging application 102 understands to correspond to "gulprit@gmail.com" in this example) and the user had indicated that composition of the email message has been completed, such initiating transmission of the email message as by selecting a "send" icon 423 of the message composition GUI 418.

In response to this indication that composition has completed, the messaging application 102 can then reassess the recipient message address fields to determine whether a candidate name can be determined therefrom. In this instance, the messaging application can identify the candidate name "Gulprit", and thus when analyzing the message body 422, may identify the word "Culprit" potentially as a misspelled version of the candidate name "Gulprit", and thus provide an autocorrect option, such as the autocorrect option 324 of FIG. 3, to replace "Culprit" with "Gulprit" in the message body 422. In this manner, the messaging application 102 can continue to update the name composition assistance process as additional message context becomes available.

Figure 5:
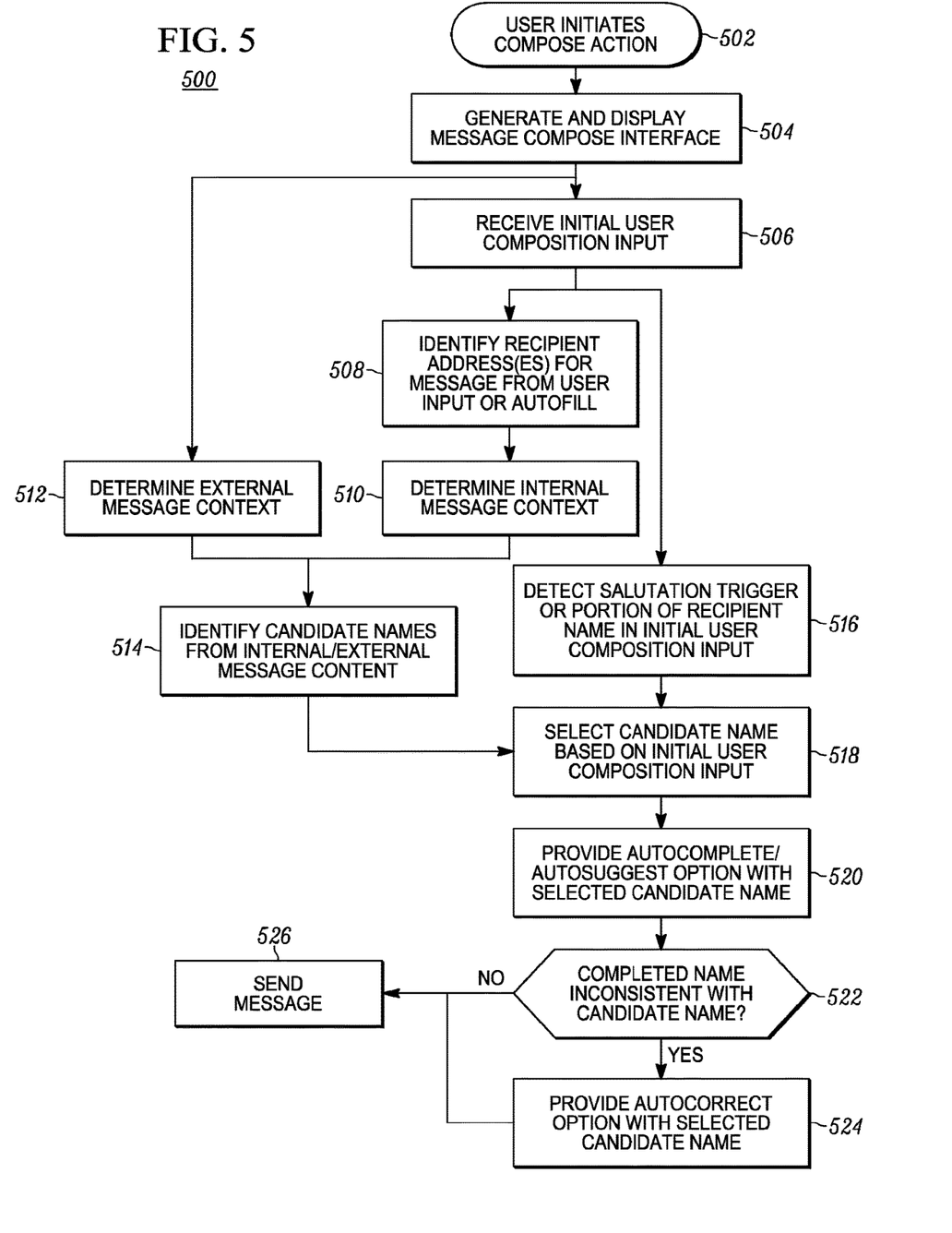
FIG. 5 is a flow diagram illustrating a method for providing recipient name composition assistance for composition of a recipient name in a message body of an electronic message in accordance with at least one embodiment of the present disclosure.

FIG. 5 illustrates an example method 500 of operation of the messaging application 102 of the electronic device 100 for providing name composition assistance during electronic message composition in accordance with at least one embodiment. The method 500 initiates at block 502 with the user performing an action to initiate composition of an electronic message. This action can include, for example, user input indicating an instruction to the messaging application 102 to initiate message composition, such as by selecting a "compose message" icon in a GUI of the messaging application 102 or in a GUI of the OS 108 (FIG. 1). In some instances, the composition of the electronic message can be initiated indirectly. To illustrate, a separate application may link or otherwise redirect the user to the messaging application 102 for message composition. To illustrate, a website displayed in a web browser may include a link that initiates an application programming interface (API) call to the messaging application 102 in order to permit the user to compose an electronic message in association with the website (e.g., forwarding an article on the website to a specified recipient or forwarding a message to a recipient associated with the website).

In response to this initiation input, at block 504 the messaging application 102 generates and displays a message composition GUI to facilitate user input for the composition of an electronic message. The message composition GUI typically includes a number of fields, including one or more recipient message address fields (e.g., to:, cc: and bcc: email address fields) and one or more message body fields—that is, non-recipient-address fields (note that the term "message body" can include, for example, the subject line field of an email message as this is akin to a title of the message). With the message composition GUI displayed, at block 506 initial user composition input is received by the messaging application 102 via the message composition GUI.

In some instances, this initial user composition input can include the user providing address nicknames or incomplete recipient message addresses in one or more recipient message address fields of the electronic message. In such instances, at block 508 the messaging application 102 identifies the full or complete recipient message addresses using an autofill feature of the messaging application 102. This autofill feature can, for example, use the nickname or partial recipient message address to perform a lookup in the contacts database 114 (FIG. 1) to identify the complete recipient message address.

At block 510, the messaging application 102 prepares to support the recipient name composition assistance process for the electronic message being composed by determining internal message context that may be useful in identifying candidate names. This internal message context includes message context determined directly from the fields of the electronic message being composed, and thus can include recipient message addresses in the recipient message address fields of the electronic message, file names of attached files listed in an attachment field or the content of the attached files themselves, and content already present in a message body field, such as any initial content drafted by the user in the message body, or the electronic message may include a reply message or forwarding message, in which case the message body may contain the content of the original electronic message serving as the basis of the reply or forwarding message. This content of the original electronic message can include, for example, the recipient message addresses for the original electronic message, as well as one or more recipient names in a message body field.

In some embodiments, candidate names also may be determined based on external message context; that is, message context that is not directly identified by a field of the electronic message being composed, and thus at block 512 the messaging application 102 determines such external message context. This external message context can include, for example, the determination of a recipient name from the contacts database 114 based on a lookup using at least a portion of a recipient message address. Furthermore, as the electronic message composition may have been triggered by another application (e.g., the website example described above), the external message context can include context information about this other application, such as the content in the application associated with the link or other source of origination of the electronic message.

With one or both of the internal message context and external message context determined, at block 514 the messaging application 102 identifies one or more candidate names for the electronic message from the internal and external message context. As described in greater detail below, the identification of these candidate names can include a parsing of name-related information in the internal message context, name lookups based on recipient-specific information from the message context, and the like. Any candidate names so identified can be stored to the temporary candidate name database 116 (FIG. 1) maintained by the messaging application 102 for the electronic message.

Concurrent with the candidate name identification process, at block 516 the messaging application 102 monitors the initial user composition input to detect a salutation trigger that indicates that the user may intend to include a recipient name in the message body field. As noted above, this salutation trigger can include input of a word that typically serves as part of a salutation in a message, such as the typing of "Hi", "Hello", "Dear", etc. The salutation trigger instead may include the input of at least part of a word in an area of the message body normally utilized for salutations, such as the first word or two in the message body, or the set of words located in the uppermost left corner of the message body field, or the input of an initial set of letters that matches the corresponding initial set of letters of a candidate name.

In response to detecting the salutation trigger, at block 518 the messaging application 102 selects a candidate name (if there is more than one candidate name) that may reflect the recipient name the user is going to, or is attempting to, input in association with the salutation trigger. This selection process can involve application of one or more prioritization rules. For example, a prioritization rule may provide that candidate names determined from the recipient message address fields of the electronic message may have selection priority over candidate names determined from the non-recipient-address fields, that is, the message body fields. Furthermore, a prioritization rule may provide that candidate names determined from the to: address field may be given selection priority over candidate names determined from the cc: address field, which in turn are given selection priority over candidate names determined from the bcc: address field, etc. In situations whereby the salutation trigger includes the user inputting an initial set of letters of a word expected to be a recipient's name, selection priority among multiple candidate names may be given to the candidate name that most closely matches the initial set of letters.

With a candidate name selected, at block 520 the messaging application 102 can facilitate recipient name composition by providing, via the messaging composition GUI, one or both of an autosuggest option (e.g., FIG. 1) or an autocomplete option (e.g., FIG. 2) that graphically presents the candidate name to the user for inclusion in the message body of the electronic message in a way to precludes many likely user input errors for the recipient name. In the event that the autosuggest option/autocomplete option is not accepted by the user, or in the event that neither option is presented, at block 522 the messaging application 102 continues to monitor the user composition input to determine whether the user has completed a word, predicted to be intended by the user as a recipient name, that is inconsistent with one or more of the identified candidate names (e.g., doesn't match any of the identified candidate names). This analysis may be performed relatively quickly after the user has completed input of the word (e.g., after a space character is entered following the word) or after the user has signaled completion of composition of the electronic message, such as by selecting a "save" icon or by attempting to initiate transmission of the electronic message through selection of a "send" icon.

If such candidate name/completed word mismatch or inconsistency occurs in the message body, then at block 524 the messaging application 102 can provide an autocorrect option (e.g., FIGS. 3 and 4) so as to notify the user of the potential error and to give the user an option to correct the error (if it is an error) by replacing the word at issue with the proffered candidate name instead. After making this correction, or if no such correction is necessary in the first place, at block 526 the messaging application 102 completes composition of the electronic message and sends the electronic message to the messaging provider 104 (FIG. 1) for distribution to the one or more recipient messaging addresses specified in the recipient message address fields of the electronic message.

Figure 6:
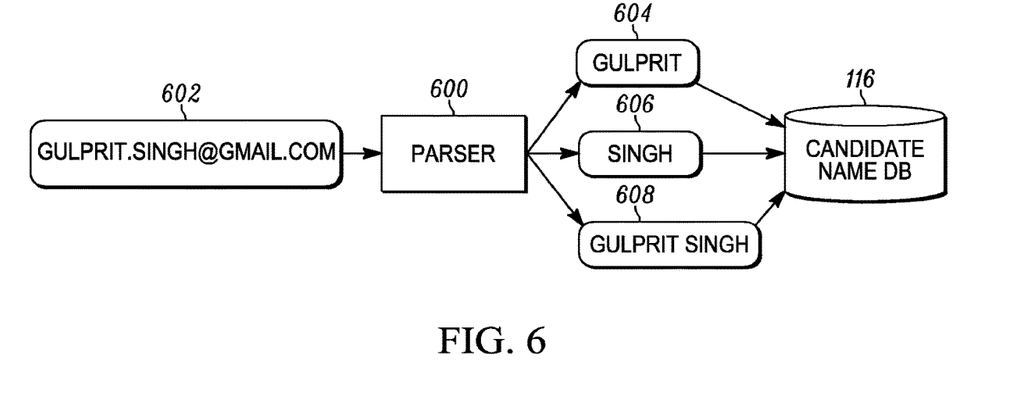
FIG. 6 is a diagram illustrating a technique for identifying candidate names for recipient name composition assistance during composition of an electronic message by parsing a recipient message address of a recipient of the electronic message in accordance with at least one embodiment of the present disclosure.
Figure 7:
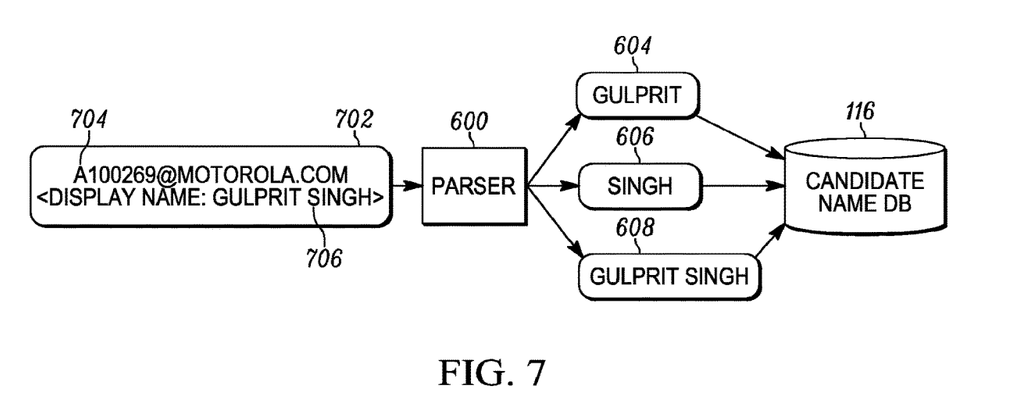
FIG. 7 is a diagram illustrating a technique for identifying candidate names for recipient name composition assistance during composition of an electronic message by parsing a display name associated with a recipient messaging address of a recipient of an electronic message in accordance with at least one embodiment of the present disclosure.
Figure 8:
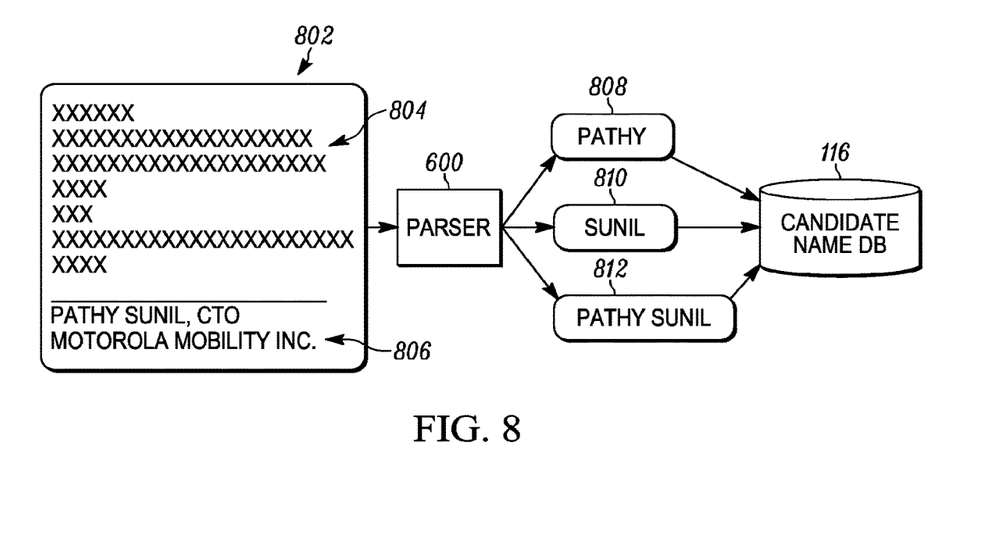
FIG. 8 is a diagram illustrating a technique for identifying candidate names for recipient name composition assistance during composition of an electronic message by parsing a message body of the electronic message in accordance with at least one embodiment of the present disclosure.
Figure 9:
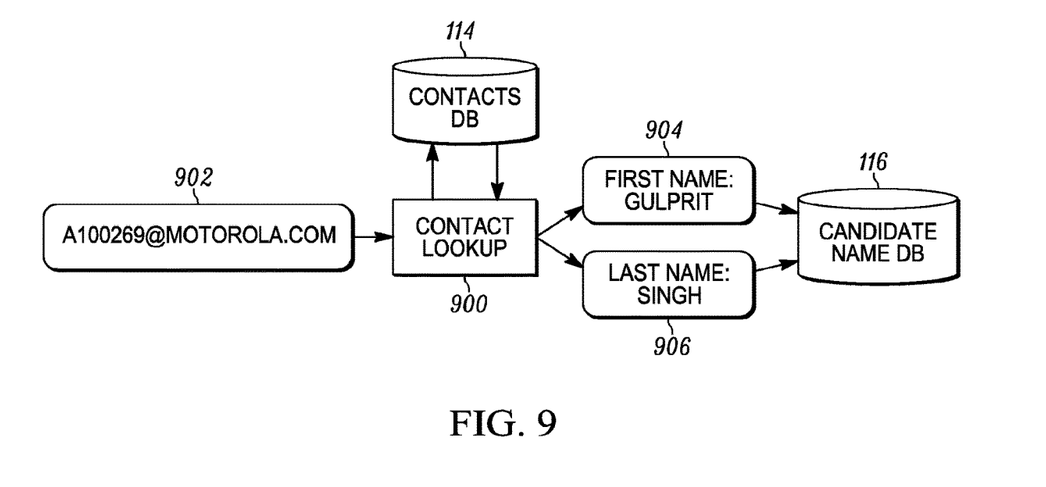
FIG. 9 is a diagram illustrating a technique for identifying candidate names for recipient name composition assistance during composition of an electronic message by performing a contact lookup in a contacts database using message context from one or more fields of the electronic message in accordance with at least one embodiment of the present disclosure.
Figure 10:
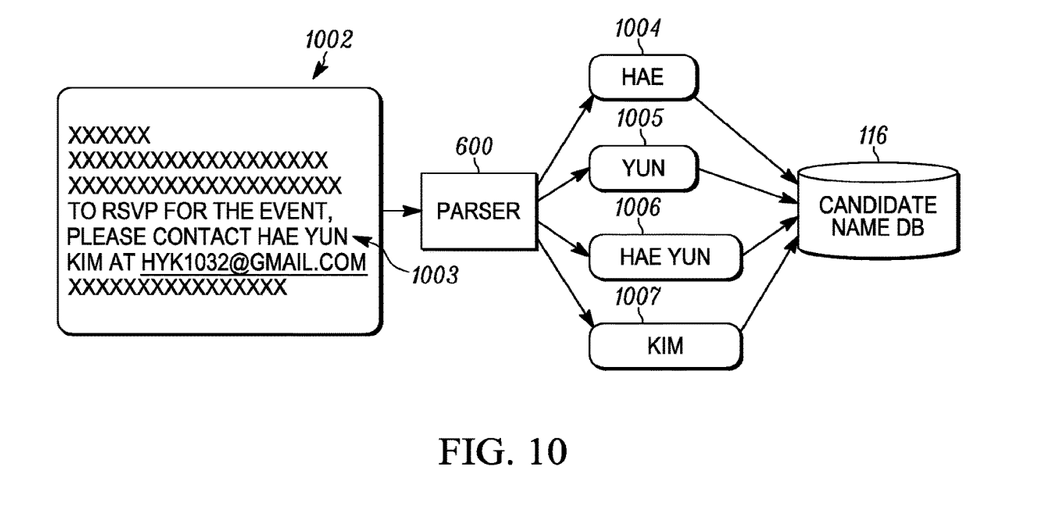
FIG. 10 is a diagram illustrating a technique for identifying candidate names for recipient name composition assistance during composition of an electronic message by parsing content of another application that triggered composition of the electronic message in accordance with at least one embodiment of the present disclosure.

FIGS. 6-10 illustrate example techniques that may be employed by the messaging application 102, the OS 108, or other component of the electronic device 100 of FIG. 1 for identifying one or more candidate names from the message context 112 of an electronic message being composed. In particular, FIGS. 6-8 illustrate techniques that identify candidate names from internal message context (that is, the information within the fields of the message itself), and FIGS. 9 and 10 illustrate techniques that identify candidate names from external message context (that is, context from external sources accessed or identified based on internal message context).

FIG. 6 illustrates a technique for identifying one or more candidate names from the recipient message addresses present in the recipient message address fields of the electronic message. In this approach, a parser 600 of the messaging application 102 accesses a recipient-specific portion of a recipient message address and parses likely name words from the recipient-specific portion. However, because a recipient's name may include multiple words, the parser 600 further can generate various combinations of the name words parsed from the recipient message address to generate multiple candidate names. To illustrate, in the depicted example, the parser 600 accesses a recipient email address 602 (one embodiment of the recipient message address) from a to: address field or a cc: address field, or from the original email message included in the message body of in the event that the email message being composed is a reply email message or forwarded email message. Email addresses typically are composed of a recipient-specific portion followed by a domain portion, with a "@" symbol separating the two. Thus, the email address "gulprit.singh@gmail.com" includes a recipient-specific portion "gulprit.singh" and a domain portion "gmail.com." The parser 600 thus may parse the recipient-specific portion to identify one or more potential name words, whereby the parser 600 can use various common name word delimiters, such as a period ("."), underscore ("_"), dash ("-"), and the like to detect separate words. Thus, for the recipient-specific portion "gulprit.singh" of the recipient email address 602, the parser 600 may generate the name words "gulprit" and "singh", and from combinations of these name words arrive at three candidate names 604, 606, 608—"Gulprit", "Singh", and "Gulprit Singh", respectively. "Singh Gulprit" also could be a reasonable candidate name if the convention of the email addressing system is to place the last name, or family name, first in the email address. The parser 600 then may place these candidate names 604, 606, and 608 in the candidate name database 116 of the electronic device 100 for subsequent use in name composition assistance as described above. This process may be similarly applied for parsing the file names of files listed in an attachment field of the electronic message.

FIG. 7 illustrates a technique for identifying one or more candidate names from a display name field associated with a recipient message address present in the recipient message address fields of the electronic message. Often, for security reasons or other reasons, an organization providing an electronic messaging service to its constituents may elect to use a recipient-specific portion of the recipient message address that, while unique to the recipient, is not reflective of the recipient's name. Such configurations make identification of candidate names directly from the recipient message address difficult if not impossible. However, email protocols and other messaging protocols often provide one or more user-identification fields that can be more useful at identifying a recipient than the recipient's messaging address. To illustrate, email protocols provide for the inclusion of a display name field in association with a recipient email address, where the display name field stores a user-friendly display name. The parser 600 may use such user name fields to identify one or more candidate names. As an example, a recipient of an email message being composed may be referenced in an email recipient field set 702 that includes an email address field 704 that stores the email address "A100269@motorola.com" and a display name field 706 that stores the display name "Gulprit Singh." The recipient-specific portion "A100269" of the email address does not contain any useful information to directly identify one or more name words, and thus the parser 600 instead can parse the display name "Gulprit Singh" in the display name field 706 to identify one or more candidate names. As with the example of FIG. 6, the parsing of this display name can result in candidate names 604, 606, 608—"Gulprit", "Singh", and "Gulprit Singh", respectively, which are stored in the candidate name database 116 for use in name composition assistance by the messaging application 102.

FIG. 8 illustrates a technique for identifying one or more candidate names from a message body field of the electronic message. Often, when composing the electronic message, the message body field may contain content that includes or otherwise identifies at least a portion of a name of one or more recipients of the electronic message. To illustrate, the electronic message may be in reply to a previous electronic message or may be forwarding the previous electronic message to another recipient. In such instances, one or more of the message body fields and recipient message address fields of the previous electronic message may be incorporated into the message body field of the electronic message being composed. Thus, the message body field may include the recipient message addresses of the recipients of the previous electronic message, the display names associated with the recipient message addresses, or other references to likely recipients, such as the signature line included by the sender of the previous electronic message in the message body of the previous electronic message. The parser 600 thus may parse a message body field of the electronic message in such cases to identify one or more candidate names.

To illustrate, the example of FIG. 8 depicts a message body field 802 of a reply email message being composed, whereby the message body field 802 includes content 804 of the original email message. This content 804 includes a signature line 806 of the sender of the original message. Thus, the parser 600 may parse the content 804 to identify the signature line 806 using any of a variety of parsing techniques, and then parse the signature line 806 to identify potential name words. This parsing can include, for example, discarding or ignoring words pre-identified in, for example, a parsing dictionary (not shown) as not indicative of recipient names. In parsing the illustrated signature line 806, the parser 600 would ignore the words "CTO", "Motorola", "Mobility", and "Inc.", and thus arrive at the name words "Pathy" and "Sunil" as name words. From combinations these name words, the parser 600 can generate, for example, candidate names 808, 810, 812—"Pathy", "Sunil", and "Pathy Sunil" respectively, and store these candidate names 808, 810, 812 in the candidate name database for use in name composition assistance by the messaging application 102. This process may be similarly applied to parsing the content of files listed as attachments in an attachment field of the electronic message.

FIG. 9 illustrates a technique for indirectly identifying one or more candidate names using the contacts database 114 (FIG. 1) maintained at the electronic device 100. As noted above, the recipient message address may not contain information useful for directly identifying candidate names, and there may not be a display name or other user-friendly naming field associated with the recipient message address. However, the user may have had prior dealings with the recipient associated with the recipient message address, and thus may have a contact record for the recipient in the contacts database 114. This contact record can include various information regarding the recipient, such as the recipient's name, title, employer, address, telephone number, and various electronic messaging addresses for the recipient. Accordingly, in such instances, the messaging application 102 or other component of the electronic device 100 of FIG. 1 can employ a contact lookup module to identify a contact record associated with message context identified in one or more fields of the electronic message being composed, and from this contact record indirectly identify one or more candidate names.

To illustrate, in the depicted example the only information identifying a recipient of an email message being composed is an email address 902, which has recipient-specific portion "A100269" that is not reflective of the name of the recipient associated with the email address 902. Accordingly, the contact lookup module 900 can use this recipient-specific portion to search the contacts database 114 for a contact record that has a field that matches the recipient-specific portion "A100269". For this example, the contacts database 114 has a matching contact record, associated with a person named "Gulprit Singh", and thus the contact lookup module 900 can parse the name fields in this matching contact record to identify the first name word 904 of "Gulprit" and the last name word 906 of "Singh". The contact lookup module 900 can then store these name words 904, 906 in the candidate name database 116, whereupon the parser 600 (FIG. 6) then combines the name words into various candidate names "Gulprit", "Singh", and "Gulprit Singh", or the contact lookup module 900 can generate these candidate names directly before storing them to the candidate name database 116. Thus, as this example illustrates, the contact lookup module 900 uses internal message context, namely the recipient email address 902, to indirectly identify one or more candidate names via external message context, namely a contact record in the contacts database 114.

FIG. 10 illustrates a technique for indirectly identifying one or more candidate names using user-readable content of an application from which composition of an electronic message was triggered. Web browsers, social media application, and other such applications often have the ability to trigger or initiate the composition of an electronic message. To illustrate, a web browser may display a news website having a link that, when selected by a user, contacts the messaging application 102 to initiate composition of an electronic message that, for example, is used to forward an associated news article to a recipient. Other electronic messages themselves may have such links that trigger composition of an electronic message. In such instances, with the observation that a recipient name often is found in proximity to the link or other feature in the content of the application, the application that triggers the composition of an electronic message may have user-readable content that can serve as a basis for identifying one or more candidate names of a recipient of the electronic message. Thus, the parser 600 may parse this user-readable content of the other application to identify one or more candidate names.

To illustrate, in the depicted example a webpage displayed by a web browser includes user-readable content 1002 that includes text instructing the view to make reservations to an event by contacting "Hae Yun Kim" at the specified email address "HYK1032@gmail.com", and whereby the text of the email address serves as a hypertext link that, when selected by a viewer via the web browser causes the web browser to contact the messaging application 102 to initiate composition of an email message addressed to "HYK1032@gmail.com". Because no useful candidate names can be parsed from this email address, the parser 600 instead may parse the user-readable content of the web page in proximity to the hypertext link to identify one or more candidate names. In this example, this text in proximity includes the phrase 1003 of "To RSVP for the event, please contact Hae Yun Kim at HYK1032@gmail.com," which the parser 600 can parse to identify the name words "Hae," "Yun", and "Kim", and which may be combined, for example, into candidate names 1004, 1006, 1008, and 1010—"Hae", "Yun", "Hae Yun", and "Kim", respectively, and stored at the candidate name database 116.

It will be appreciated that the application from which the electronic message was initiated may be separate from the messaging application 102. In such instances, the parser 600 may be implemented outside of the messaging application 102, such as in the other application or in the OS 108, so as to be able to access the content of the other application. Alternatively, the parser 600 may be implemented as part of the messaging application 102, and the user-readable content of the other application may be passed to the parser 600 as part of the request to initiate composition of the electronic message. For example, an API call made by the other application in response to the viewer's selection of the hypertext link can include the uniform resource locator (URL) of the webpage in which the user-readable content is found, and the parser 600 thus can use this URL to access the webpage and parse its content for name word identification.

Figure 11:
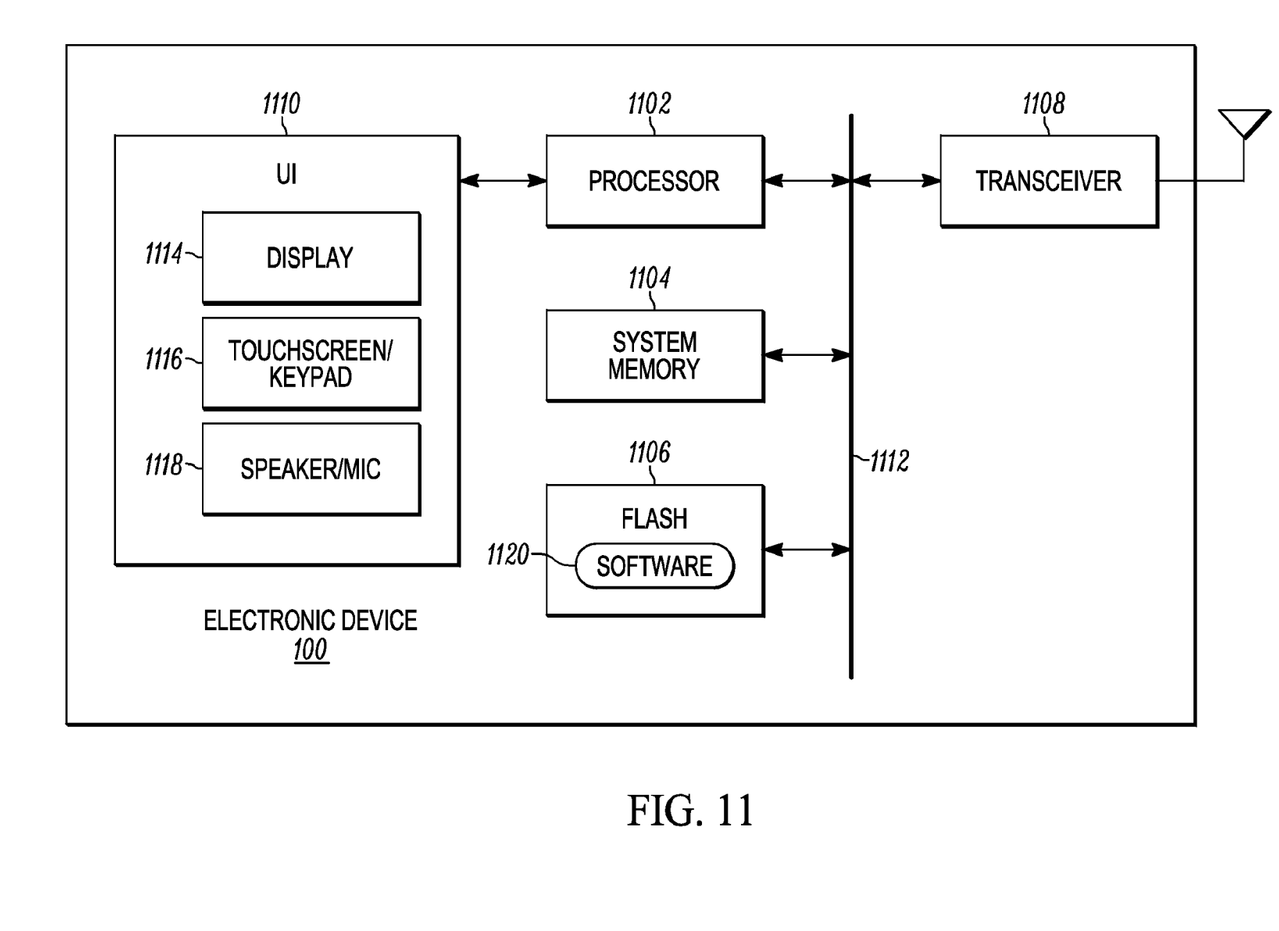
FIG. 11 is a diagram illustrating an implementation of the electronic device 100 in accordance with at least one embodiment of the present disclosure.

FIG. 11 illustrates an example implementation of the electronic device 100 of FIG. 1 in accordance with at least one embodiment of the present disclosure. In the depicted example, the electronic device 100 includes at least one processor 1102 (e.g., a central processing device or CPU), one or more non-transitory computer readable storage media, such as system memory 1104 or another storage device 1106 (e.g., flash memory, optical or magnetic disc drive, solid state hard drive, etc.), a network interface 1108 (e.g., a wireless local area network (WAN) interface or wired Ethernet interface), and a user interface (UI) 1110 connected via one or more busses 1112 or other interconnects. The UI 1110 includes, for example, a display device 1114 and a keypad or touchscreen 1116, as well as other input/output components 1118, such as a speaker or microphone, to receive input from, or provide information to, a user.

The processor 1102 executes a set of executable instructions stored at a computer readable storage medium, such as the system memory 1104 or flash memory, whereby the set of executable instructions represent one or more software applications 1120, such as the messaging application 102 of FIG. 1. The software applications 1120, when executed, manipulate the processor 1102 to perform various software-based functionality to implement at least a portion of the techniques described above, provide visual information via the display device 1114, respond to user input via the touchscreen 1116, and the like. Thus, much of the inventive functionality and many of the inventive principles described above are well suited for implementation with or in software programs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs minimal experimentation. Therefore, in the interest of brevity and minimization of any risk of obscuring the principles and concepts according to the present disclosure, further discussion of such software, if any, will be limited to the essentials with respect to the principles and concepts within the preferred embodiments.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The steps of the flowcharts depicted above can be in any order unless specified otherwise, and steps may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The invention claimed is:

1. A method for providing composition assistance in an electronic messaging application, the method comprising:
receiving, by one or more processors, information regarding composition of an electronic message associated with the electronic messaging application, the electronic message including a set of fields;
determining, by the one or more processors, an external message context, wherein the external message context is associated with content of an application from which the composition of the electronic message was initiated;
identifying, by the one or more processors, a set of candidate textual elements based on the external message context;
selecting, by the one or more processors, a given one of the set of candidate textual elements; and
presenting, via the messaging application, the given candidate textual element in a selected field of the set of fields of the electronic message.

2. The method of claim 1, wherein presenting the given candidate textual element in the selected field is done via automated completion of a text string.

3. The method of claim 2, wherein presenting the given candidate textual element via automated completion of the text string includes differentiating one or more characters of the text string by using at least one of a different color, text type or underlining.

4. The method of claim 1, further comprising:
identifying, by the one or more processors, an input textual element in a first field of the set of fields in the electronic message;

wherein presenting the given candidate textual element in the selected field of the set of fields of the electronic message occurs in a different field than the first field.

5. The method of claim 4, further comprising determining, by the one or more processors, an internal message context in response to identifying the input textual element.

6. The method of claim 5, wherein the external message context comprises a contact record of a recipient that is indirectly accessed using information from the internal message context.

7. The method of claim 1, wherein the external message context includes a contacts database of a client device.

8. The method of claim 1, wherein identifying the set of candidate textual elements includes parsing content of the external message context to identify individual words or combinations or words that are predicted to represent selected words.

9. The method of claim 1, wherein identifying the set of candidate textual elements includes parsing content of the external message context and using the parsed content to perform a lookup to identify a corresponding candidate textual element.

10. The method of claim 1, wherein selecting the given one of the set of candidate textual elements includes applying one or more prioritization rules to the set of candidate textual elements.

11. A method for providing name composition assistance in an electronic messaging application, the method comprising:
identifying, by one or more processors, a set of candidate names based on an external message context of the electronic message, wherein the external message context is associated with content of an application from which the composition of the electronic message was initiated,
selecting, by the one or more processors, a given one of the set of candidate names, and
automatically presenting via the messaging application the selected candidate name in a selected field of the electronic message.

12. The method of claim 11, further comprising:
adding the selected candidate name to a temporary database; and
automatically presenting the selected candidate name includes presenting the selected candidate name from the temporary database in the selected field of the electronic message.

13. The method of claim 11, further comprising:
detecting a salutation trigger based on user input;
wherein selecting the given candidate name is performed in response to detecting the salutation trigger.

14. The method of claim 13, wherein:
the salutation trigger includes an initial set of letters of a word expected to be a recipient's name; and
selecting the given candidate name includes evaluating priority among multiple candidate names of the set of candidate names based on a candidate name that most closely matches the initial set of letters.

15. A system to provide name composition assistance in a messaging application, the system comprising one or more processors configured to:
receive information regarding composition of an electronic message associated with the electronic messaging application, the electronic message including a set of fields;
determine an external message context, wherein the external message context is associated with content of an application from which the composition of the electronic message was initiated;
identify a set of candidate textual elements based on the external message context;
select a given one of the set of candidate textual elements; and
present, via the messaging application, the given candidate textual element in a selected field of the set of fields of the electronic message.

16. The system of claim 15, wherein presentation of the given candidate textual element in the selected field is done via automated completion of a text string.

17. The system of claim 16, wherein presentation of the given candidate textual element via automated completion of the text string includes differentiation of one or more characters of the text string by using at least one of a different color, text type or underlining.

18. The system of claim 17, wherein the one or more processors are further configured to:
identify an input textual element in a first field of the set of fields in the electronic message;
wherein presentation of the given candidate textual element in the selected field of the set of fields of the electronic message occurs in a different field than the first field.

19. The system of claim 18, wherein the one or more processors are further configured to determine an internal message context in response to identifying the input textual element.

20. The system of claim 15, wherein the external message context is associated with either (i) a contact record of a recipient that is indirectly accessed using information from the internal message context, or (ii) a contacts database of a client devices.

21. The method of claim 1, wherein the association with the content of the application corresponds to a link configured for initiating the composition.

22. The method of claim 11, wherein the association with the content corresponds to a link configured for initiating the composition.

23. The system of claim 15, wherein the association with the content of the application corresponds to a link configured for initiating the composition.

* * * * *